United States Patent
Shaw et al.

(10) Patent No.: US 9,752,420 B2
(45) Date of Patent: Sep. 5, 2017

(54) METHOD OF LINING AN OIL WELL PIPE IN SITU

(71) Applicants: Mark D. Shaw, Ponte Vedra Beach, FL (US); Matt Clancy, Jacksonville, FL (US); Laurence M. Bierce, Steinhatchee, FL (US)

(72) Inventors: Mark D. Shaw, Ponte Vedra Beach, FL (US); Matt Clancy, Jacksonville, FL (US); Laurence M. Bierce, Steinhatchee, FL (US)

(73) Assignee: ULTRATECH INTERNATIONAL, INC., Jacksonville, FL (US)

(*) Notice: Subject to any disclaimer, the term of this patent is extended or adjusted under 35 U.S.C. 154(b) by 298 days.

(21) Appl. No.: 14/606,503

(22) Filed: Jan. 27, 2015

(65) Prior Publication Data

US 2015/0211342 A1    Jul. 30, 2015

Related U.S. Application Data

(60) Provisional application No. 61/931,826, filed on Jan. 27, 2014.

(51) Int. Cl.
| | | |
|---|---|---|
| *E21B 43/10* | (2006.01) | |
| *E21B 29/10* | (2006.01) | |
| *B29C 63/34* | (2006.01) | |
| *B29C 63/00* | (2006.01) | |

(52) U.S. Cl.
CPC ............ *E21B 43/108* (2013.01); *B29C 63/34* (2013.01); *E21B 29/10* (2013.01); *B29C 63/0021* (2013.01)

(58) Field of Classification Search
None
See application file for complete search history.

(56) References Cited

U.S. PATENT DOCUMENTS

| | | | |
|---|---|---|---|
| 2,664,373 A | | 12/1953 | Reilly |
| 3,125,124 A | * | 3/1964 | Daniels et al. ......... E21B 17/00 138/141 |
| 3,499,486 A | * | 3/1970 | Scott ....................... E21B 23/00 166/147 |
| 4,104,095 A | * | 8/1978 | Shaw ...................... B29C 70/82 138/125 |
| 4,496,499 A | | 1/1985 | Brittain et al. |
| 5,225,121 A | | 7/1993 | Yokoshima |
| 2008/0196900 A1 | | 8/2008 | Leibfried et al. |
| 2009/0178809 A1 | | 7/2009 | Jeffryes et al. |
| 2013/0327526 A1 | * | 12/2013 | Ibatullin ................ E21B 43/086 166/278 |

FOREIGN PATENT DOCUMENTS

GB        2504261 A      1/2014

* cited by examiner

*Primary Examiner* — Shane Bomar

(57) ABSTRACT

A method of lining a metal oil well pipe in situ, by providing a pipe liner composed of a polymer tube having a fabric or mesh reinforcing layer mechanically bonded to its exterior, inserting the pipe liner into the oil well pipe by adding water or other weighting means into the pipe liner, and opening the pipe liner to allow oil to flow therethrough, thereby expanding the pipe liner composite tightly against the oil well pipe.

4 Claims, 2 Drawing Sheets

METHOD OF LINING AN OIL WELL PIPE IN SITU

This application claims the benefit of U.S. Provisional Patent Application Ser. No. 61/931,826, filed Jan. 27, 2014, the disclosure of which is incorporated by reference herein.

BACKGROUND OF THE INVENTION

This invention relates generally to the fields of repairing, retrofitting, rehabilitating or lining pipes, and in particular relates to the field of repairing, retrofitting, rehabilitating or lining vertically-oriented, metal, oil well pipes in situ, whereby new pipes or damaged, corroded or weak pipes may be provided with a liner more resistant the corrosive and destructive components of the oil brought up through the metal oil well pipes.

Metal oil well pipes may extend several kilometers into the earth to reach the source of the oil, which is then delivered to the surface at high pressure and high temperature. The oil contains corrosive elements, including chemicals that negatively react with the metal pipe, as well as abrasive particles. Over time, the metal pipes are sufficiently damaged so as to require replacement, which is an expensive, labor- and time-intensive task, and which also results in lost revenue due to the cessation of oil flow through the well being replaced.

The extent of vertical extension of the oil well pipes into the earth precludes simply inserting a polymer tube into the metal pipe, since the total weight of the polymer tube will eventually exceed its longitudinal tensile strength and the polymer tube will fracture or separate.

It is an object of this invention to provide a method of lining an oil well pipe in situ, which method results in the metal pipe being lined with a polymer tube possessing greater resistance to the degradation effects of the oil. The pipe liner is manufactured with tensile reinforcement such that the weight of the pipe liner will not cause rupture or failure of the pipe liner during installation. Damaged oil pipes may be repaired with this method, and newer pipes will have their useful life greatly extended. The rehabilitation or improvement of the pipe may be accomplished at relatively low cost and with less time and labor than conventional methods.

SUMMARY OF THE INVENTION

In general the invention is a method of lining an oil well pipe comprising the steps of producing a pipe liner by mechanically interlocking a reinforcing layer onto a polymer tube, the exterior diameter of the pipe liner being less than the interior diameter of an oil well pipe to be lined; sealing the oil well pipe at a location below the section of the oil well pipe to be lined; inserting the pipe liner into the oil well pipe; and securing the pipe liner to the oil well pipe by unsealing the oil well pipe and allowing heat and pressure from oil advancing through the pipe liner to expand the pipe liner against the oil well pipe; and further wherein the step of producing the pipe liner comprises choosing the reinforcing layer from the group of reinforcing layers consisting of fabric or mesh, positioning the reinforcing layer around the polymer tube, and heating the exterior of the polymer tube such that the outer surface of the polymer tube protrudes into the reinforcing layer; and further comprising the steps of sealing the pipe liner prior to the step of inserting the pipe liner into the oil well pipe, partially filling the pipe liner with a liquid, and unsealing the pipe liner prior to the step of unsealing the oil well pipe; and wherein the step of producing the pipe liner is performed by continuously extruding the polymer tube.

DESCRIPTION OF THE INVENTION

Figure 1:
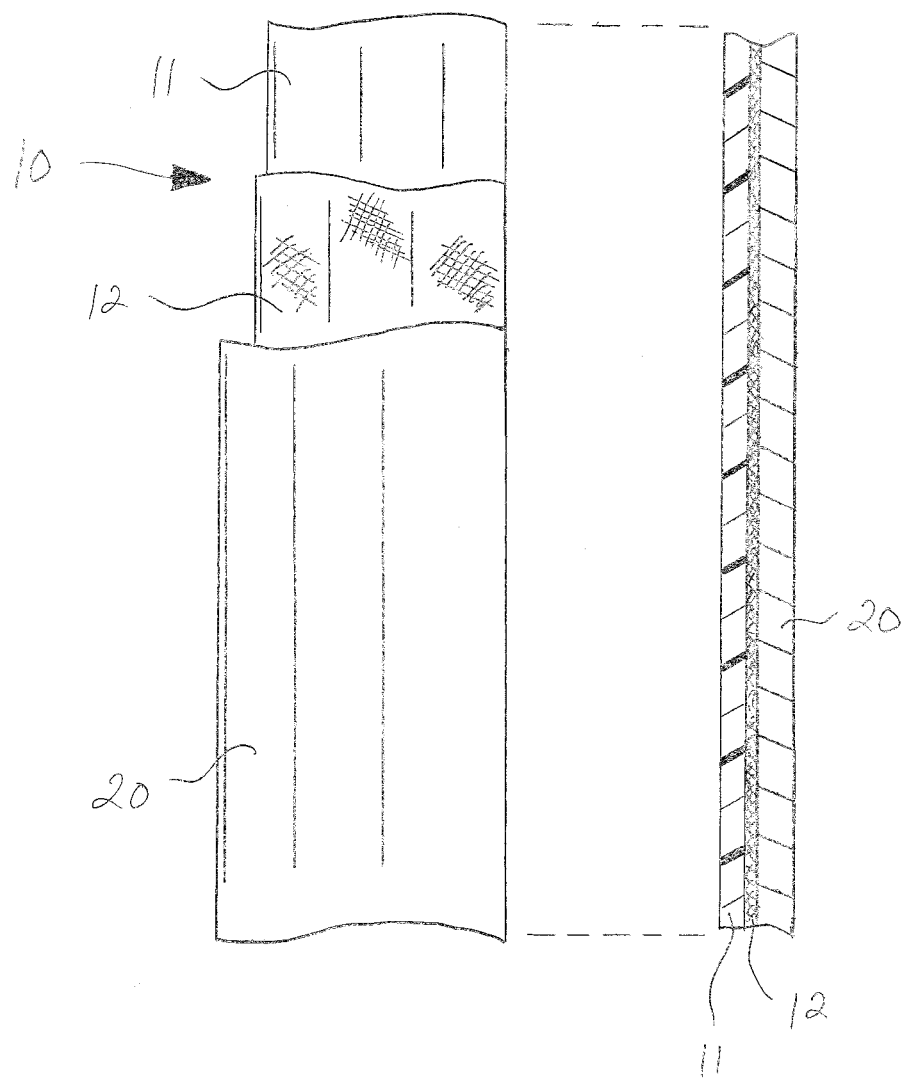
FIG. 1 is a partially exposed and cross-sectional view of a representative pipe liner as inserted and expanded within an oil well pipe.
Figure 2:
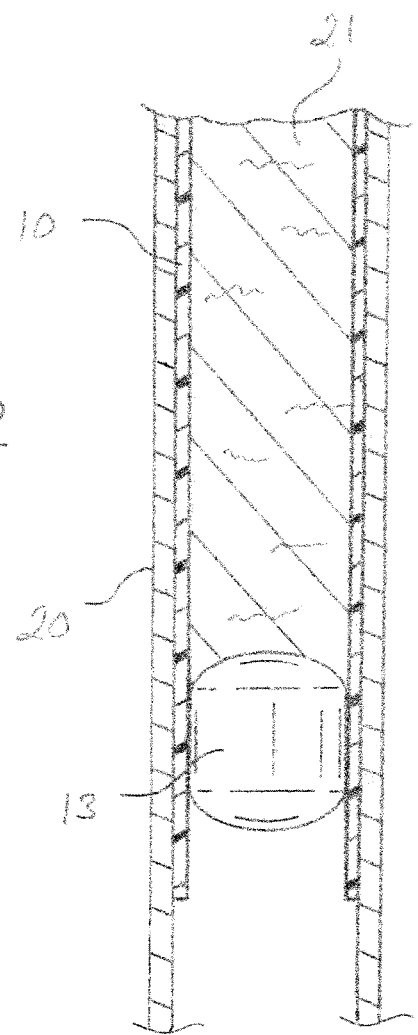
FIG. 2 is a partially exposed and cross-sectional view of a representative sealed pipe liner as inserted within a sealed oil well pipe.

The pipe liner 10 of the invention may be produced in various ways. Essentially, the pipe liner 10 comprises a relatively rigid polymer tube 11, composed for example of a PE or PP or similar material possessing the necessary characteristics for its production and ultimate use. The pipe liner 10 may be produced in sections and joined on site, but is preferably continuously extruded on site in known manner. A polymer that expands under the application of heat is required. Completely surrounding the outer surface of the polymer tube 11 is a reinforcing layer 12 consisting of a fabric or mesh material, such as glass fibers, glass threads, metal mesh or the like, possessing high tensile strength and low elongation under tension. The reinforcing layer 12 may be helically wound around the surface of the polymer tube 11 at ambient temperature and in the absence of a bonding agent or adhesive, but preferably the reinforcing layer 12 is produced as a tubular sleeve into which the polymer tube 11 may be inserted or extruded.

In the finished pipe liner 10, a mechanical bond is provided between the reinforcing layer 12 and the surface of the polymer tube 11. Such bond is produced by heating the exterior of the reinforcing layer wrapped polymer tube 11 such that portions of the outer surface will expand and flow radially outward into the apertures of the reinforcing layer 12 so that the polymer material partially embeds and embraces the various fibers forming the reinforcing layer 12 to create a mechanical interlock or bond. Most preferably the reinforcing layer 12 is formed of glass fibers since such material has high tensile strength but a relatively low coefficient of thermal expansion and is capable of withstanding substantial heat. The mechanical bonding of the reinforcing layer 12 to the outer surface of the polymer tube 11 is accomplished by applying direct heat to the exterior by flame, infrared radiation or any other suitable means.

The heat causes thermal expansion of the polymer tube 11 without excessive heat transfer into the interior body of the polymer tube 11 such that the polymer tube 11 remains circular in cross-section. The differential thermal expansion of material of composition of the polymer tube 11 and the material of composition of the reinforcing layer 12 causes the outer surface of the polymer tube 11 to flow into the reinforcing layer 12, thereby locking the reinforcing layer 12 to the polymer tube 12 when the pipe liner 10 cools. In such condition the pipe liner 10 includes surface nodules or projections which protrude into the openings in the reinforcing layer 12 and partially around the fibers of the reinforcing layer 12. The nodules mechanically interlock with such fibers to produce a strong mechanical bond between the reinforcing layer 12 and the polymer tube 11. The technique is illustrated for example in U.S. Pat. No. 4,104,095, the disclosure of which is incorporated herein by reference.

The combination of the reinforcing layer 12 and the polymer tube 11 results in a pipe liner 10 with greatly increased tensile strength, such that the pipe liner 10 will not fracture or tear under its own weight when thousands of feet of the pipe liner 10 are inserted down into the well pipe.

The pipe liner 10 is preferably produced on site in a continuously extruded process for direct insertion into the metal oil well pipe 20 such that no joints exist in the pipe liner 10. Alternatively, the pipe liner 10 may be assembled by successively joining sections, but care must be taken to provide overlapping reinforcing layers 12 at the joints to insure that the pipe liner 10 does not separate at the joints. The outer diameter of the pipe liner 10 is chosen to be slightly less than the inner diameter of the metal oil well pipe 20 such that the pipe liner 10 may be passed down through the oil well pipe 20 with lesser resistance.

In installation of the pipe liner 10, the oil well pipe 20 is first sealed off at a depth below the point where the retrofit is to occur in order to stop the flow of oil through the oil well pipe 20. The distal end of the pipe liner 10 is sealed, such as by the use of an expandable bladder plug 13, and the pipe liner 10 is partially filled with water or oil 21 to add sufficient weight to the pipe liner 10 to aid in the full insertion of the pipe liner 10 into the oil well pipe 20. Once the pipe liner 10 is in place, an end sealer will be engaged to secure the end of the pipe liner 10 in place in known manner. Once secure, the distal sealed end of the pipe liner 10 is opened to allow the hot oil to flow into the interior of the pipe liner 10. This heats and raises the pressure within the pipe liner 10. The heat and the pressure slightly expand the pipe liner 10 and further extend the protrusions through and beyond the reinforcing layer 12, thereby pressing the pipe liner 10 against the inside of the steel oil well pipe 20 to seal and secure the pipe liner 10 within the oil well pipe 20. All oil flow in the well will now be in contact only with the inside wall of the pipe liner 10.

The use of this pipe liner 10 achieves the following benefits: protection of the original steel pipe 20 from corrosive gases and liquids, protection of the original steel pipe 20 from abrasive solids, increasing the flow rate due to a better coefficient of friction, extending the life of the piping system by years, potentially decades, and allowing for easy removal and replacement of the pipe liner 10 as needed.

The proposed solution has been successfully abrasion tested (in-house). Analysis indicates that the pipe liner 10 has the ability to withstand the pressure (4000 psi) and temperature (up to 150 c). Abrasion testing on six sets of samples of Polyethylene (PE) and Polypropylene (PP) showed no measurable thickness change after 2.5 minutes of blasting. The blasting was with 100 grit aluminum oxide at 90 psi, 45 degrees, and 1.0 inch (25.4 mm) distance. Two sets of abrasion tests were performed. The two sets of tests were performed at different temperatures. Blasting was performed on 3 samples of each at 80 degrees Fahrenheit (27 C). Blasting was performed on the remaining 3 samples of PE at 240 degrees (116 C) Fahrenheit and the remaining 3 samples of PP at 330 degrees Fahrenheit (166 C). In all cases any change in material thickness was not measurable.

Unreinforced PE and PP have tensile creep strengths of about 300 psi at 74 degrees Fahrenheit (23 C). With a wall thickness of 0.2 inch (5 mm) each 12 feet (3.65 M) of down-length will add 1 pound of tensile stress to the pipe wall at the top support. At 74 degrees F. (23 C) a drill pipe 3,600 feet (1,097 M) long would separate from the top support after several hundred hours. At temperatures above 240 degrees Fahrenheit (116 C) down-lengths of less than 100 feet (30 M) will cause separation and failure of the unreinforced PE or PP liner. Separation is avoided up to the loss of strength temperatures by the addition of a fabric sleeve reinforcing layer 12 mechanically bonded to the exterior of the polymer tube 10.

Representative glass fabric support structure details: for E-glass fibres, a tensile strength of about 2.400 GPa~=348,000 psi (typical for steel=400 MPa~=58,000 psi), and for S-glass fibres, a tensile strength: 4.500 GPa~=652,000 psi.

A 4 inch (102 mm) ID PE pipe will weigh about 1 pound per foot of down-length (i.e. 4,500 pounds (2,041 kg) for a 4,500 foot (1.37 km) depth. This is far more than the unreinforced PE liner can support. If a steel mesh is added to the back of the PE pipe that has a total lengthwise area of 0.125 square inch (81 mm$^2$) [strength of 7,250 pounds (3,289 kg)], the total weight hanging on the mesh is about 6,230 pounds (2,826 kg). The steel mesh has about 1,000 pounds (454 kg) more strength than is necessary to support the hanging length.

As can be seen from the above numbers, reinforcing layers 12 composed of glass fibers can be made that are around 10 times stronger than the steel. That means 10 times the depth for the same area of glass fiber or $\frac{1}{10}$ as much area of glass for the same depth.

It is contemplated that equivalents and substitutions for certain elements or steps set forth above may be obvious to those of skill in the art, and therefore the true scope and definition of the invention is to be set forth in the following claims.

We claim:

1. A method of lining an oil well pipe comprising the steps of:
   producing a pipe liner by mechanically interlocking a reinforcing layer onto a polymer tube, the exterior diameter of said pipe liner being less than the interior diameter of an oil well pipe to be lined;
   temporarily sealing said oil well pipe at a location below a section of said oil well pipe to be lined to block flow of oil through said section of said oil well pipe;
   inserting said pipe liner into said section of said oil well pipe;
   unsealing said oil well pipe to allow said oil to advance through said pipe liner, whereby heat and pressure from said oil advancing through said pipe liner causes said pipe liner to expand against said oil well pipe; and
   further comprising the steps of sealing said pipe liner prior to said step of inserting said pipe liner into said oil well pipe, partially filling said pipe liner with a liquid, and unsealing said pipe liner prior to said step of unsealing said oil well pipe.

2. The method of claim 1, wherein said step of producing said pipe liner comprises choosing said reinforcing layer from the group of reinforcing layers consisting of fabric or mesh, positioning said reinforcing layer around said polymer tube, and heating the exterior of said polymer tube such that the outer surface of said polymer tube protrudes into said reinforcing layer.

3. The method of claim 1, wherein said step of producing said pipe liner is performed by continuously extruding said polymer tube.

4. The method of claim 2, wherein said step of producing said pipe liner is performed by continuously extruding said polymer tube.

* * * * *